(12) United States Patent
Ren

(10) Patent No.: US 11,561,205 B2
(45) Date of Patent: Jan. 24, 2023

(54) ELECTRO-MAGNETIC ACOUSTIC TRANSDUCER (EMAT) HAVING ELECTROMAGNET ARRAY FOR GENERATING CONFIGURABLE BIAS MAGNETIC FIELD PATTERNS

(71) Applicant: ULC TECHNOLOGIES, LLC, Hauppauge, NY (US)

(72) Inventor: Baiyang Ren, Hauppauge, NY (US)

(73) Assignee: ULC TECHNOLOGIES, LLC, Hauppauge, NY (US)

( * ) Notice: Subject to any disclaimer, the term of this patent is extended or adjusted under 35 U.S.C. 154(b) by 228 days.

(21) Appl. No.: 16/863,455

(22) Filed: Apr. 30, 2020

(65) Prior Publication Data
US 2021/0341432 A1    Nov. 4, 2021

(51) Int. Cl.
G01N 29/24   (2006.01)
B06B 1/04    (2006.01)
G01N 29/04   (2006.01)

(52) U.S. Cl.
CPC ........... *G01N 29/2412* (2013.01); *B06B 1/04* (2013.01); *G01N 29/041* (2013.01); *G01N 29/043* (2013.01); *B06B 2201/54* (2013.01); *G01N 2291/0422* (2013.01); *G01N 2291/0427* (2013.01)

(58) Field of Classification Search
CPC ....... G01N 29/2412; G01N 2291/0422; G01N 2291/0427; G01N 29/041; G01N 29/043; B06B 1/04
USPC .......................................................... 73/643
See application file for complete search history.

(56) References Cited

U.S. PATENT DOCUMENTS

| 3,697,867 | A | * | 10/1972 | Kleesattel | B06B 1/04 324/227 |
| 4,127,035 | A | | 11/1978 | Vasile | |
| 4,248,092 | A | | 2/1981 | Vasile et al. | |
| 4,295,214 | A | | 10/1981 | Thompson | |
| 4,471,658 | A | | 9/1984 | Morimoto | |
| 5,747,986 | A | | 5/1998 | Hristoforou | |
| 7,697,375 | B2 | | 4/2010 | Reiderman et al. | |
| 2006/0027022 | A1 | * | 2/2006 | Flora | G01N 29/2412 73/644 |
| 2007/0211572 | A1 | | 9/2007 | Reiderman et al. | |

(Continued)

FOREIGN PATENT DOCUMENTS

JP          2010237093 A  *  10/2010  ............. G01N 29/26

*Primary Examiner* — Lisa M Caputo
*Assistant Examiner* — Rose M Miller
(74) *Attorney, Agent, or Firm* — Husch Blackwell LLP

(57) ABSTRACT

An electro-magnetic acoustic transducer (EMAT) having an electromagnet array is provided. The electromagnet array includes electromagnets. Each electromagnet includes a magnetic core and a wound coil wrapped around the magnetic core. The electromagnet array generates bias magnetic fields having different patterns when the wound coils are energized differently. For instance, the electromagnet array generates a bias magnetic field having a given pattern, for the EMAT to transmit a first type of ultrasonic wave such as shear-horizontal wave, when the wound coils are energized in a given manner; and generates a bias magnetic field having a different pattern, for the EMAT to transmit a second type of ultrasonic wave such as a Lamb wave, when the wound coils are energized in a different manner.

17 Claims, 8 Drawing Sheets

(56) References Cited

U.S. PATENT DOCUMENTS

| | | | |
|---|---|---|---|
| 2008/0160639 A1* | 7/2008 | Su | B01F 33/30 |
| | | | 436/526 |
| 2012/0103097 A1* | 5/2012 | Lopez Jauregui | G01N 29/2412 |
| | | | 73/643 |
| 2016/0225507 A1* | 8/2016 | Catalan | B60L 7/14 |
| 2017/0299554 A1* | 10/2017 | Bondurant | G01N 29/2412 |
| 2019/0094184 A1* | 3/2019 | Ren | G01N 29/2412 |

* cited by examiner

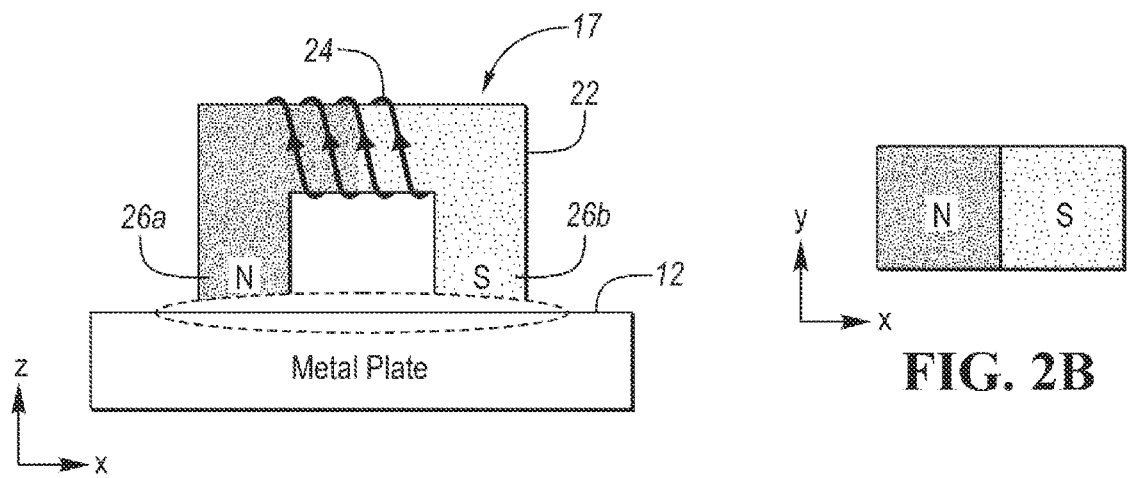
FIG. 2A
FIG. 2B
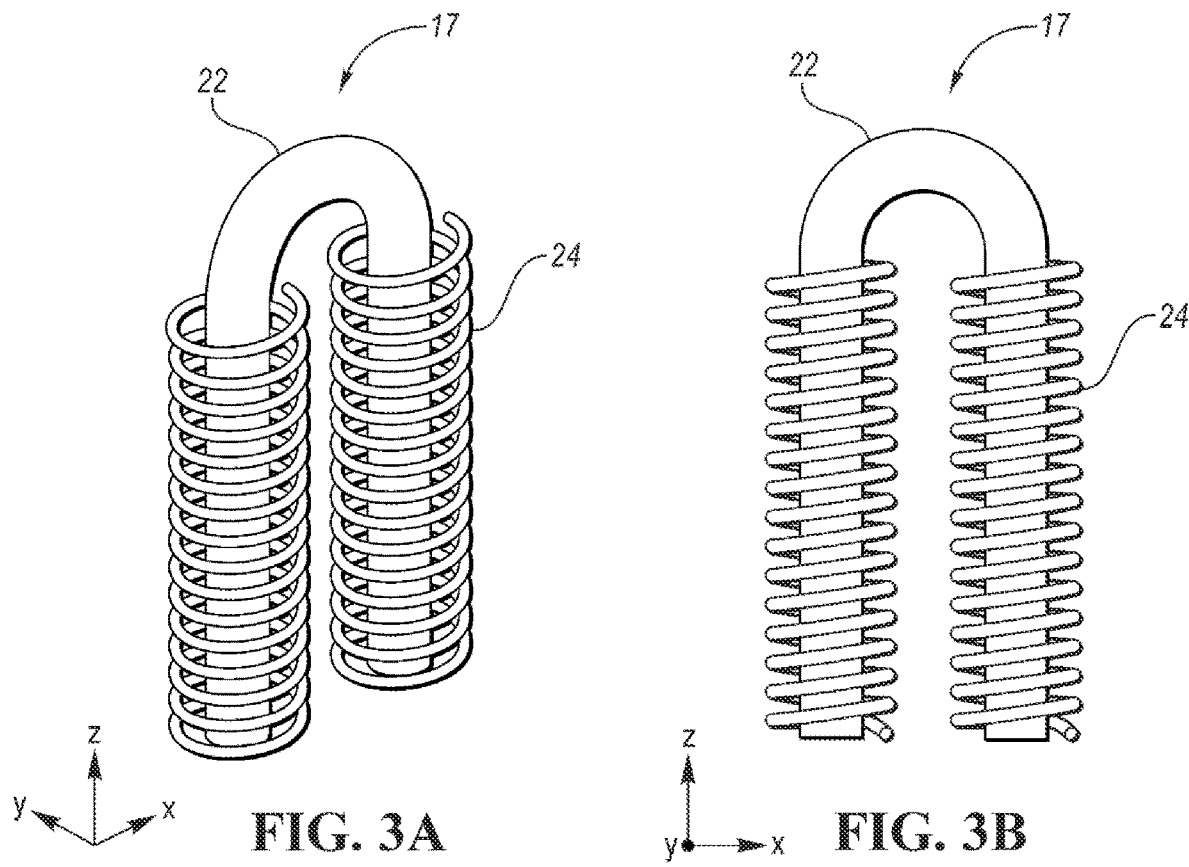
FIG. 3A
FIG. 3B

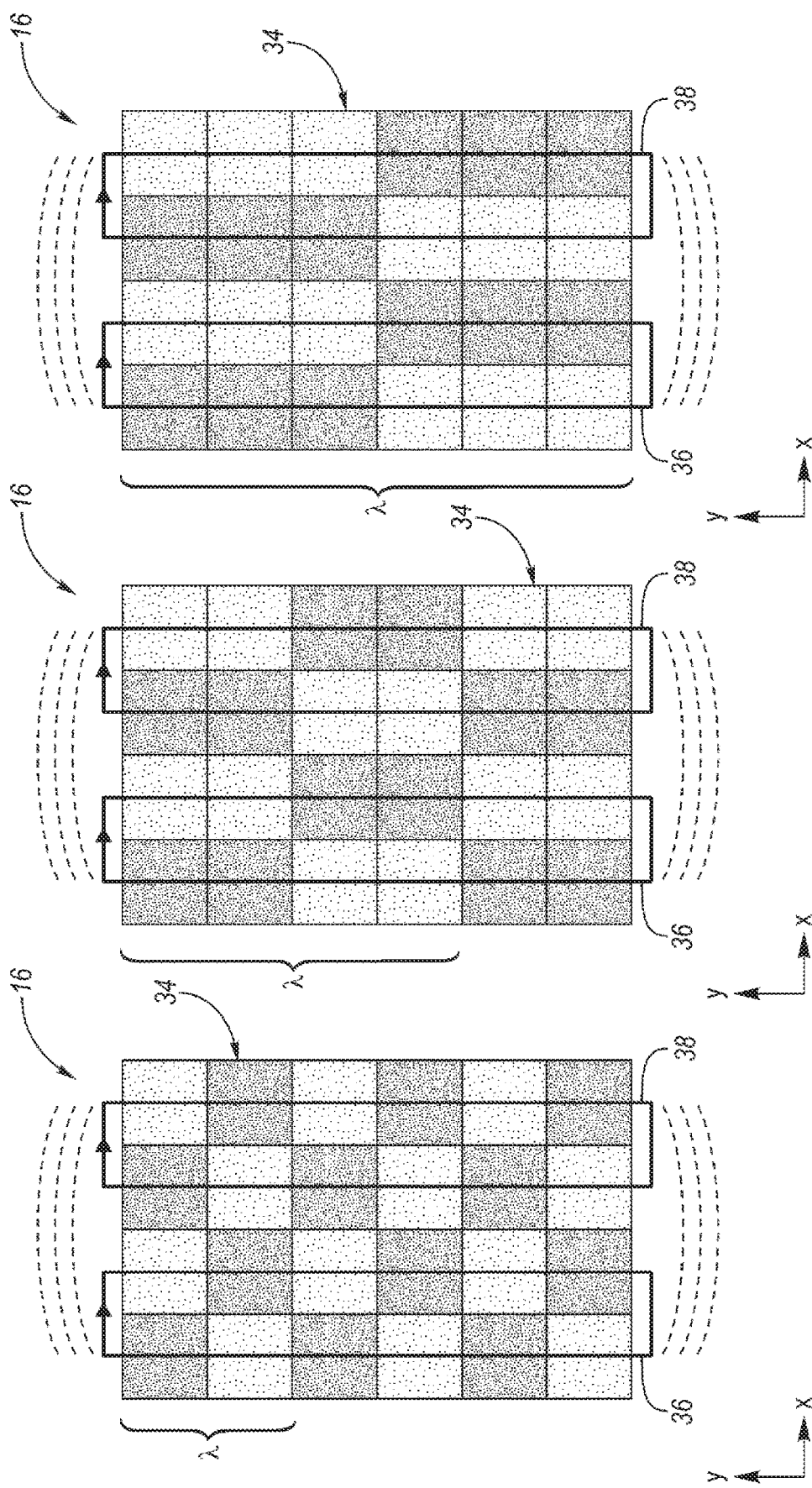

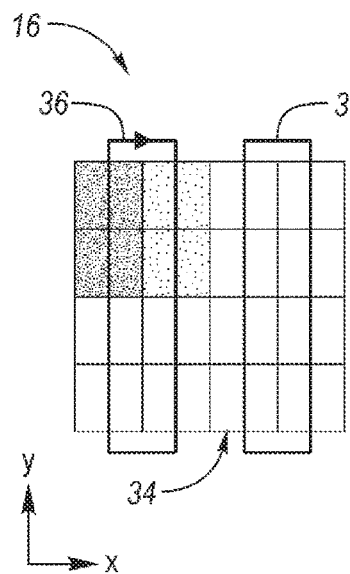 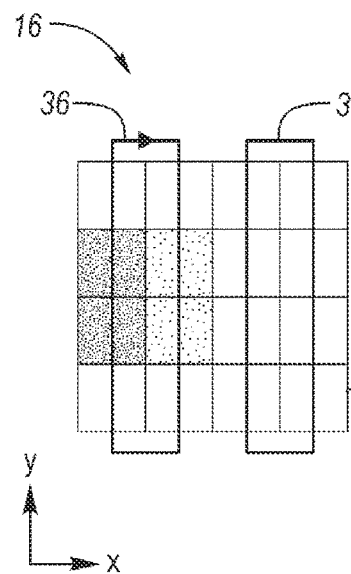 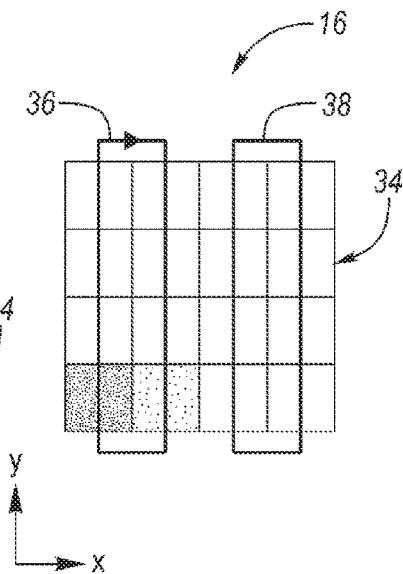
FIG. 9A  FIG. 9B  FIG. 9C
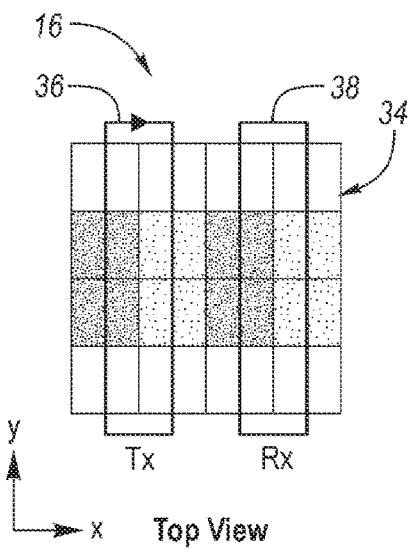 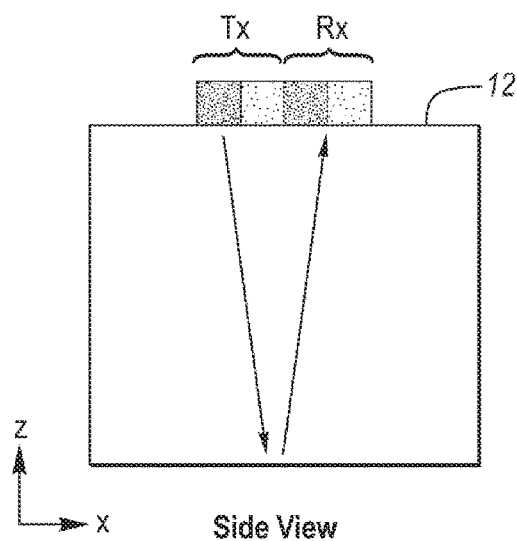
FIG. 10A  FIG. 10B

# ELECTRO-MAGNETIC ACOUSTIC TRANSDUCER (EMAT) HAVING ELECTROMAGNET ARRAY FOR GENERATING CONFIGURABLE BIAS MAGNETIC FIELD PATTERNS

TECHNICAL FIELD

The present invention relates to electro-magnetic acoustic transducers (EMATs).

BACKGROUND

An electro-magnetic acoustic transducer (EMAT) is a transducer (i.e., sensor) for non-contact, acoustic (i.e., ultrasonic) wave generation and reception in metallic targets. EMATs are used for in-line inspection and non-destructive testing of metallic targets.

An EMAT requires a bias magnetic field to operate. Particularly, an EMAT requires a bias magnetic field having a particular pattern (i.e., shape, field lines, etc.) for the EMAT to transmit a corresponding type of ultrasonic wave. For instance, an EMAT requires a bias magnetic field having a certain pattern for the EMAT to transmit a Lamb wave, a bias magnetic field having a different pattern for the EMAT to transmit a shear-horizontal (SH) wave, a bias magnetic field having a different pattern for the EMAT to transmit a shear-bulk wave, etc. An EMAT typically includes permanent magnets fixed in a specific configuration (i.e., a fixed permanent magnet array) to generate a bias magnetic field having a given pattern for the EMAT to transmit the corresponding type of ultrasonic wave.

SUMMARY

An electro-magnetic acoustic transducer (EMAT) having an electromagnet array is provided. The electromagnet array includes electromagnets. Each electromagnet includes a magnetic core and a wound coil wrapped around the magnetic core. The electromagnet array generates bias magnetic fields having different patterns when the wound coils are energized differently. For instance, the electromagnet array generates a bias magnetic field having a given pattern when the wound coils are energized in a given manner and generates a bias magnetic field having a different pattern when the wound coils are energized in a different manner.

In embodiments, the electromagnet array generates a bias magnetic field having a given pattern when at least one of the wound coils is energized with an electric current of one polarity (i.e., one of a positive electric current and a negative electric current) and generates a bias magnetic field having a different pattern when the at least one of the wound coils is energized with an electric current of an opposite polarity (i.e., the other one of a positive electric current and a negative electric current).

In embodiments, the electromagnet array generates a bias magnetic field having a first pattern, for the EMAT to transmit a first type of ultrasonic wave, when (i) the wound coils of a first set of the electromagnets are energized with an electric current of one polarity (e.g., a positive electric current) and (ii) the wound coils of a second set of the electromagnets are energized with an electric current of an opposite polarity (e.g., a negative electric current). The electromagnet array generates a bias magnetic field having a second pattern, for the EMAT to transmit a second type of ultrasonic wave, when (i) the wound coils of a third set of the electromagnets are energized with an electric current of the one polarity and (ii) the wound coils of a fourth set of the electromagnets are energized with an electric current of the opposite polarity.

In embodiments, the electromagnets are arranged in rows. The electromagnet array generates a bias magnetic field having a first pattern when the wound coil of each electromagnet (i) in each odd row is energized with an electric current of one polarity (e.g., a negative electric current) and (ii) in each even row is energized with an electric current of an opposite polarity (e.g., a positive electric current). The electromagnet array generates a bias magnetic field having a second pattern when the wound coil of each electromagnet in each row is energized with an electric current of the one polarity.

In embodiments, the electromagnets have poles. The wound coils of the electromagnets may be energized in one manner such that the poles have a checkerboard magnetic polarization pattern for the EMAT to transmit a corresponding first type of ultrasonic wave such as a shear-horizontal wave and may be energized in another manner such that the poles have a non-checkerboard magnetic polarization pattern for the EMAT to transmit a corresponding second type of ultrasonic wave such as a Lamb wave.

In embodiments, the magnetic cores of the electromagnets are U-shaped magnetic cores including first and second poles facing a common plane. In other embodiments, the magnetic cores of the electromagnets include first and second poles facing different planes. In either set of these embodiments, the first and second poles of each electromagnet have north and south magnetic polarizations, respectively, when the wound coil of the electromagnet is energized with an electric current of one polarity and have south and north magnetic polarizations, respectively, when the wound coil of the electromagnet is energized with an electric current of an opposite polarity.

In embodiments, the electromagnets are arranged in rows, the magnetic cores of the electromagnets include first and second poles, and the EMAT further includes an electrical coil. The first and second poles of each electromagnet are adjacently positioned in the row of the electromagnet. The first and second poles of each electromagnet have north and south magnetic polarizations, respectively, when the wound coil of the electromagnet is energized with an electric current of one polarity and have south and north magnetic polarizations, respectively, when the wound coil is energized with an electric current of an opposite polarity. The electrical coil is placed relative to the electromagnet array such that (i) a first leg of the electrical coil extends over the rows across the first poles of the electromagnets and (ii) a second leg of the electrical coil extends over the rows across the second poles of the electromagnets.

The EMAT transmits a shear-horizontal wave when the electrical coil is pulsed with an alternating electrical current, the first and second poles in each odd row have north and south magnetic polarizations, respectively, and the first and second poles in each even row have south and north magnetic polarizations, respectively. The EMAT transmits a Lamb wave when the electrical coil is pulsed with an alternating current and the first and second poles in each row have north and south magnetic polarizations, respectively.

In embodiments, first and second electromagnets are arranged in rows across columns, the magnetic cores of the electromagnets include first and second poles, and the EMAT further includes first and second electrical coils. The first and second poles of the first electromagnet in each row are adjacently positioned in the row of the first electromagnet in a first one of the columns; and the first and second poles of the second electromagnet in each row are adjacently positioned in the row of the second electromagnet in a second one of the columns. The first and second poles of each electromagnet have north and south magnetic polarizations, respectively, when the wound coil of the electromagnet is energized with an electric current of one polarity and have south and north magnetic polarizations, respectively, when the wound coil is energized with an electric current of an opposite polarity.

The first electrical coil is placed relative to the electromagnet array such that (i) a first leg of the first electrical coil extends over the rows across the first poles of the electromagnets in the first one of the columns and (ii) a second leg of the first electrical coil extends over the rows across the second poles of the electromagnets in the first one of the columns. The second electrical coil is placed relative to the electromagnet array such that (i) a first leg of the second electrical coil extends over the rows across the first poles of the electromagnets in the second one of the columns and (ii) a second leg of the second electrical coil extends over the rows across the second poles of the electromagnets in the second one of the columns.

The EMAT transmits a shear-horizontal wave when (i) the first and second electrical coils are pulsed with an alternating current of a same frequency, amplitude, and phase, (ii) the first and second poles of the electromagnets in each odd row have north and south magnetic polarizations, respectively, and (iii) the first and second poles of the electromagnets in each even row have south and north magnetic polarizations, respectively. The EMAT transmits a Lamb wave when (i) the first and second electrical coils are pulsed with an alternating current of a same frequency, amplitude, and phase, (ii) the first and second poles of the electromagnets in the first one of the columns have north and south magnetic polarizations, respectively, and (iii) the first and second poles of the electromagnets in the second one of the columns have south and north magnetic polarizations, respectively (as such, the first and second poles of the first one of the columns have opposite magnetic polarizations than the first and second poles of the second one of the columns). Alternatively, the EMAT transmits a Lamb wave when (i) the first and second electrical coils are pulsed with an alternating current of a same frequency and amplitude but opposite phase and (ii) the first and second poles of the electromagnets in each row have north and south magnetic polarizations.

In variations of these embodiments in which the EMAT includes the first and second electrical coils, the first electrical coil is used for the EMAT to transmit an ultrasonic wave toward a target and the second electrical coil is used for the EMAT to receive an ultrasonic wave back from the target. In this case, the EMAT transmits a given type of ultrasonic wave toward a target and receives an ultrasonic wave of the given type reflected back from the target when only the first electrical coil is pulsed with an alternating electrical current and the wound coils of the electromagnets in at least some of the rows across the first and second ones of the columns are energized in a given manner.

Alternatively, in the embodiments in which the EMAT includes first and second electrical coils, the second electrical coil is eliminated, and the first electrical coil instead includes first and second coil segments. In this case, the first coil is placed relative to the electromagnet array such that (i) a first leg of the first coil segment extends over the rows across the first poles of the electromagnets in the first one of the columns, (ii) a second leg of the first coil segment extends over the rows across the second poles of the electromagnets in the first one of the columns, (iii) a first leg of the second coil segment extends over the rows across the first poles of the electromagnets in the second one of the columns, and (iv) a second leg of the second coil segment extends over the rows across the second poles of the electromagnets in the second one of the columns.

In embodiments, the electromagnet array generates in a first space a bias magnetic field having a first pattern, for the EMAT to transmit a given type of ultrasonic wave from a first location of the electromagnet array, when the wound coils of the electromagnets at the first location of the electromagnet array are energized in a given manner and (ii) generates in a second space a bias magnetic field having a second pattern, for the EMAT to transmit the given type of ultrasonic wave from a second location of the electromagnet array, when the wound coils of the electromagnets at the second location of the electromagnet array are energized in a given manner.

In embodiments, the electromagnet array (i) generates a bias magnetic field having a first pattern, for the EMAT to transmit a given type of ultrasonic wave having a beam width from a first location of the electromagnet array, when a given amount of the wound coils of the electromagnets at the first location of the electromagnet array are energized in a given manner and (ii) generates a bias magnetic field having the first pattern, for the EMAT to transmit the given type of ultrasonic wave having a smaller beam width from the first location of the electromagnet array, when less than the given amount of the wound coils of the electromagnets at the first location of the electromagnet array are energized in the given manner.

In embodiments, the electromagnet array (i) generates a bias magnetic field having a first pattern, for the EMAT to transmit a given type of ultrasonic wave with a given wavelength, when the wound coils of the electromagnets are energized a certain way and (ii) generates a bias magnetic field having the first pattern, for the EMAT to transmit the given type of ultrasonic wave with a larger wavelength, when the would coils of the electromagnets are energized in another certain way.

In embodiments, the ultrasonic waves transmitted from the EMAT differ in type, such as shear-horizontal, Lamb, shear-bulk, etc., and/or in direction, such as x-direction, y-direction, and z-direction.

In embodiments, poles of the magnetic cores of the electromagnets have rectangular, square, or circular footprints.

In embodiments, poles of the magnetic cores of the electromagnets conform to a curvature of a non-planar surface or form an arc segment conforming to a curvature of a non-planar surface.

BRIEF DESCRIPTION OF THE DRAWINGS

FIG. 2A illustrates a schematic diagram of an electromagnet of an electromagnet array of the EMAT, the electromagnet being a U-shaped electromagnet;

FIG. 2B illustrates a schematic diagram of the associated magnetic polarization of the electromagnet shown in FIG. 2A;

FIG. 3A illustrates a perspective view of the electromagnet;

FIG. 3B illustrates a frontal view of the electromagnet;

FIGS. 8A, 8B, and 8C illustrate schematic diagrams of the EMAT in operation to transmit shear-horizontal waves having different wavelengths;

FIGS. 9A, 9B, and 9C illustrate schematic diagrams of the EMAT in operation to transmit shear-bulk waves at different locations and/or with different beam widths;

FIGS. 10A and 10B illustrate respective schematic diagrams of the EMAT in operation to transmit a shear-bulk wave and to receive any reflected-back portion of the shear-bulk wave;

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
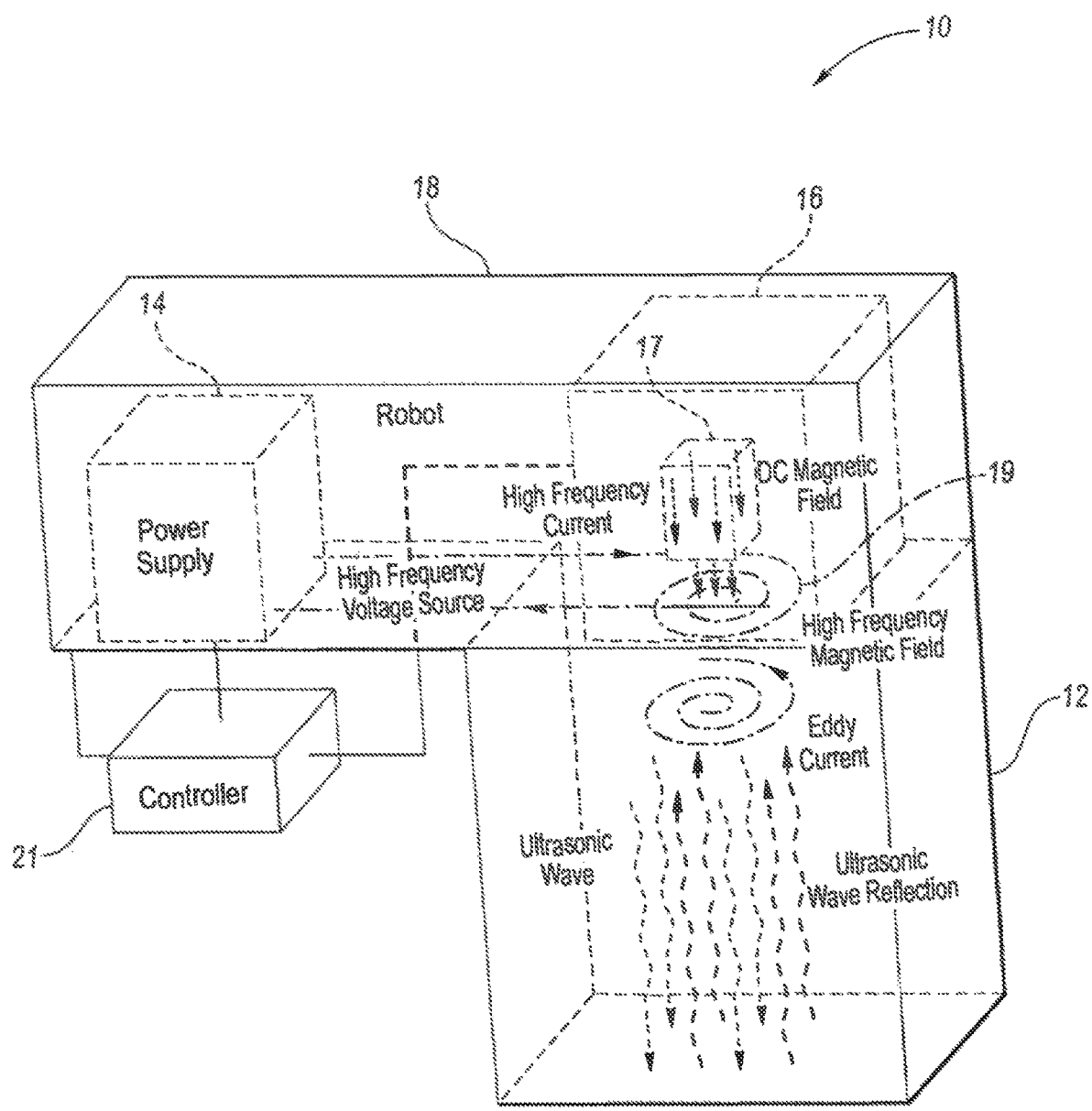
FIG. 1 illustrates a block diagram of an exemplary system having an electromagnetic acoustic transducer (EMAT) in accordance with embodiments for ultrasonic inspection of a pipe.

Referring now to FIG. 1, a block diagram of an exemplary system 10 having an electromagnetic acoustic transducer (EMAT) 16 in accordance with embodiments for ultrasonic inspection of a part to be inspected is shown. The part to be inspected is in the form of a pipe 12. System 10 further includes a power supply 14 and a robot 18. Power supply 14 is for powering EMAT 16. Power supply 14 and EMAT 16 are mounted on robot 18. Robot 18 can access (e.g., move throughout and physically against/near) pipe 12.

EMAT 16 includes an electromagnet array having one or more electromagnets 17 (only one shown in FIG. 1) and an electrical coil 19. Each electromagnet has a magnetic core and a wound coil wrapped around the magnetic core (not shown in FIG. 1). Power supply 14 is connected to the wound coils of electromagnets 17 and is connected to electrical coil 19. More particularly, power supply 14 includes (i) a DC power supply for connected to the wound coils of electromagnets 17 for supplying DC power (i.e., 0 Hz frequency) to the wound coils of the electromagnets and (ii) an AC power supply connected to electrical coil 19 for supplying AC power (e.g., high-frequency) to the electrical coil. Power supply 14 selectively outputs electrical power to the wound coils to energize electromagnet array in a given manner to generate a bias magnetic field and outputs electrical power to electrical coil 19 which thereby cause EMAT 16 to transmit an ultrasound in pipe 12. The ultrasound travels through pipe 12 and a portion of the ultrasound may reflect backward to EMAT 16.

A controller 21 (e.g., an electronic processor such as a computer) in communication with EMAT 16 detects wall thickness, wall loss, and defects such as cracks of pipe 12 based on the transmitted and received ultrasound. Controller 21 is further in communication with power supply 14 to control its operation in outputting power to EMAT 16. Controller 21 is further in communication with robot 18 to control its operation.

Referring now to FIG. 2A, a schematic diagram of one electromagnet 17 of the electromagnet array of EMAT 16 is shown. EMAT 16 is positioned near a part 12, such as a metal plate, that is to be inspected by the EMAT. Electromagnet 17 is a U-shaped electromagnet having a U-shaped magnetic core 22. Electromagnet 17 further includes a wound coil 24 wrapped around magnetic core 22. Wound coil 24 is an electrically insulated wire that is wrapped around magnetic core one or more times. Magnetic core 22 includes first and second poles 26a and 26b. In correspondence with the U-shape of magnetic core 22, poles 26a and 26b face in the same direction toward to-be-inspected part 12.

An electric current injected into wound coil 24 causes poles 26a and 26b to have opposite magnetic polarizations. Particularly, an electric current of one polarity injected into wound coil 24 causes poles 26a and 26b to respectively have north ("N") and south ("S") magnetic polarizations. In this case, first pole 26a has a N magnetic polarization and second pole 26b has a S magnetic polarization. Conversely, an electric current of an opposite polarity injected into wound coil 24 causes poles 26a and 26b to have S and N magnetic polarizations. In this case, first pole 26a has a S magnetic polarization and second pole 26b has a N magnetic polarization.

For instance, as shown in FIG. 2A, a negative DC electric current (i.e., an electric current of one polarity) injected into wound coil 24 causes poles 26a and 26b to respectively have N and S magnetic polarizations. FIG. 2B illustrates a schematic diagram of the associated magnetic polarization of electromagnet 17 in this case. A positive DC electric current (i.e., an electric current of an opposite polarity) injected into wound coil 24 causes poles 26a and 26b to respectively have S and N magnetic polarizations.

As such, the orientation of the N-S magnetic polarizations of electromagnet 17 depends on the direction of the electric current flowing in wound coil 24 of the electromagnet. Thus, the magnetic polarizations of electromagnet can be swapped by changing the direction of the electric flowing in wound coil 24.

Electromagnet 17 generates a magnetic field (i.e., a bias magnetic field) according to the polarizations of electromagnet 17. To-be-inspected part 12 is magnetized by the magnetic field such that the top surface of the part has the simplified distribution shown in FIG. 2B.

FIGS. 3A and 3B illustrate perspective and frontal views of electromagnet 17. Of course, the two toroid windings illustrated in each of FIGS. 3A and 3B belong to the single wound coil 24 of electromagnet 17. The toroid windings are always constructively enhancing the magnetic field along the U-shaped electromagnet.

Figure 4:
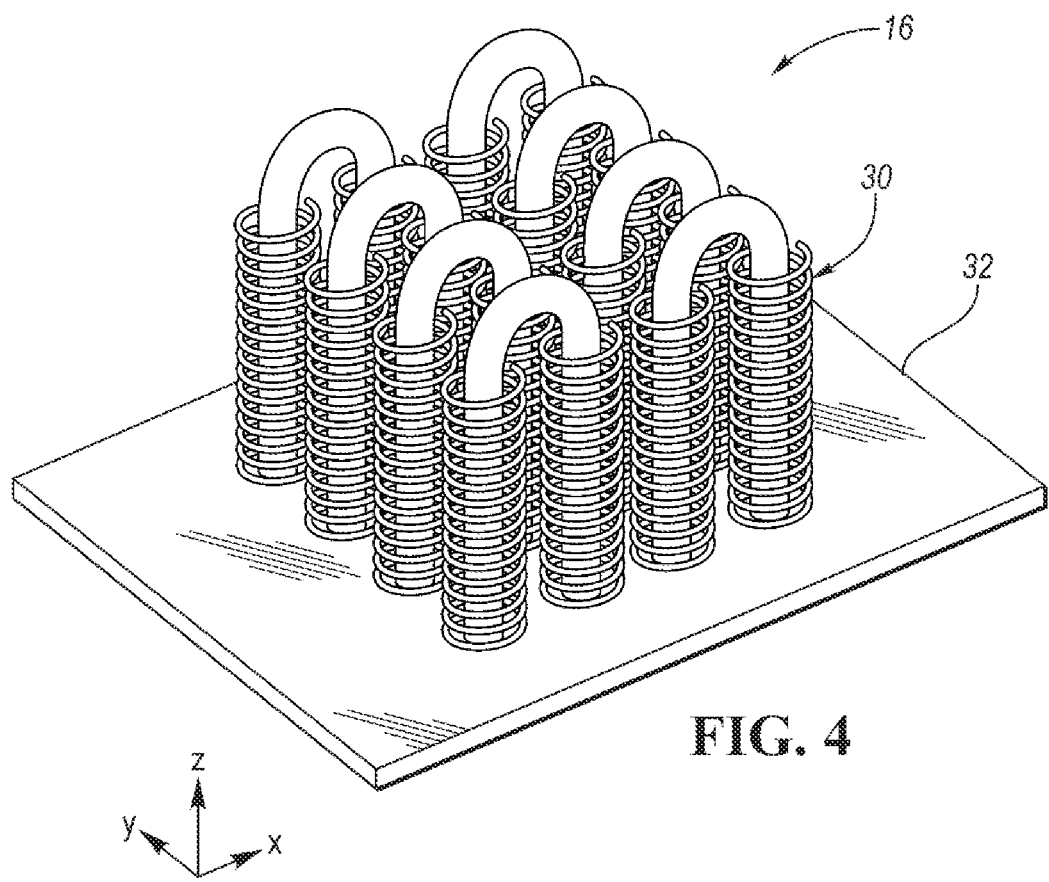
FIG. 4 illustrates a perspective view of the EMAT with the electromagnet array, having a plurality of the electromagnets, arranged adjacent to one side of a printed circuit board (PCB) of the EMAT.

Referring now to FIG. 4, with continual reference to FIGS. 2A, 2B, 3A, and 3B, a perspective view of EMAT 16 is shown. The electromagnet array of EMAT is an electromagnet array 30 having a plurality of electromagnets 17. EMAT 16 further includes a printed circuit board (PCB) 32. Electromagnet array 30 is arranged adjacent to one side of PCB 32.

Figure 5:
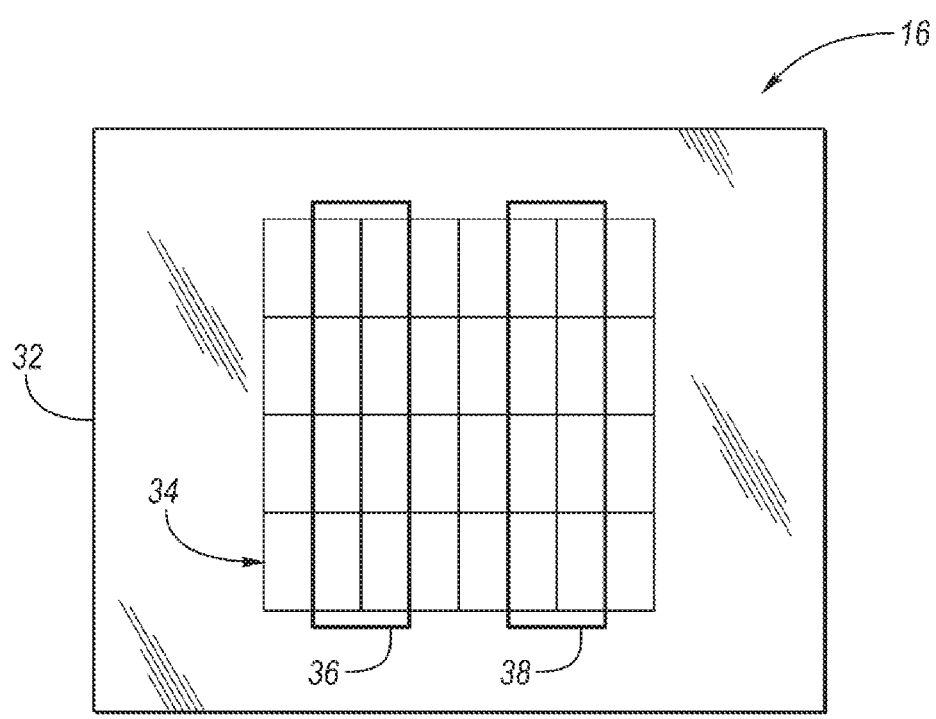
FIG. 5 illustrates a schematic diagram of the EMAT, the EMAT having electrical coils in addition to the electromagnet array and the PCB, the schematic diagram of FIG. 5 illustrating the electrical coils on the PCB and the placement of the electrical coils relative to the electromagnet array.

Referring now to FIG. 5, with continual reference to FIGS. 2A, 2B, 3A, 3B, and 4, a schematic diagram of EMAT 16 is shown. Electromagnet array 30 is not in view in FIG. 5 as the electromagnet array is underneath PCB 32 in this view. In like manner of FIG. 2B, grid pattern 34 designates the arrangement including the locations and magnetic polarizations of the poles of electromagnets 17 of electromagnet array 30.

In addition to electromagnet array 30 and PCB 32, EMAT 16 further includes first and second electrical coils 36 and 38. Electrical coils 36 and 38 are on (i.e., a part of) PCB 32. In embodiments, electrical coils 36 and/or 38 are looped coils and/or meander coils. The placement of electrical coils 36 and 38 relative to electromagnet array 30 (i.e., relative to grid pattern 34) is also shown in FIG. 5.

Electromagnet array 30 can create a configurable bias magnetic field arrangement for EMAT 16 using electromagnets 17. The configuration of the bias magnetic field arrangement is composed by controlling the direction flowing in wound coils 24 of electromagnets 17. Examples of magnetic field arrangements which allow a single, two electrical coil EMAT to generate specific ultrasonic waves will now be described with reference to the remaining Figures.

Figure 6A:
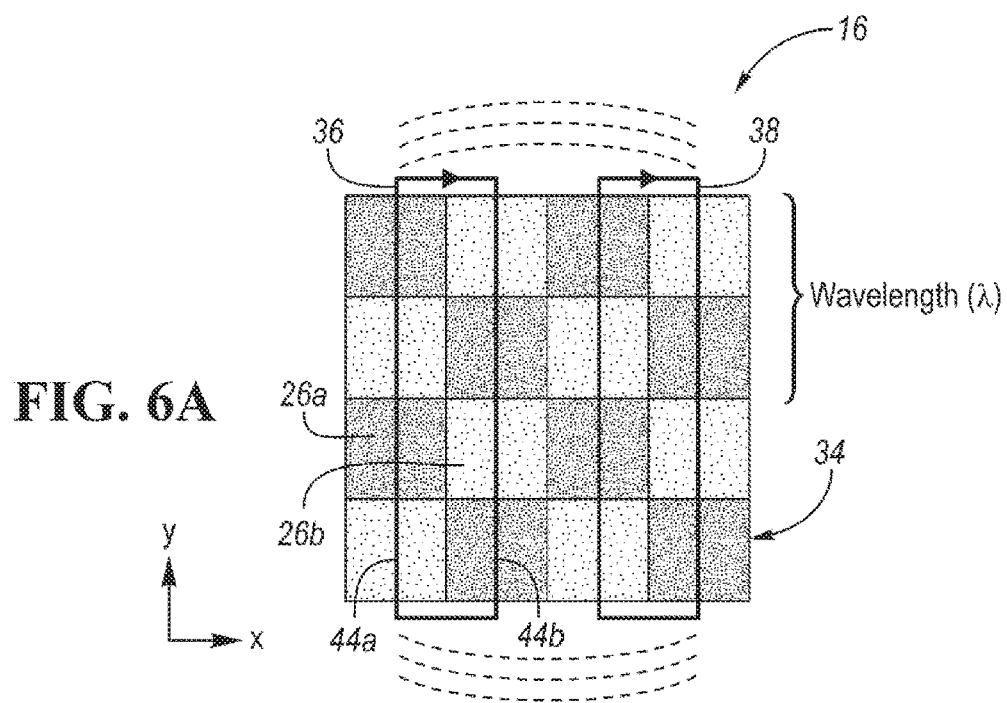
FIG. 6A illustrates a schematic diagram of the EMAT in operation to transmit a shear-horizontal wave.
Figure 6B:
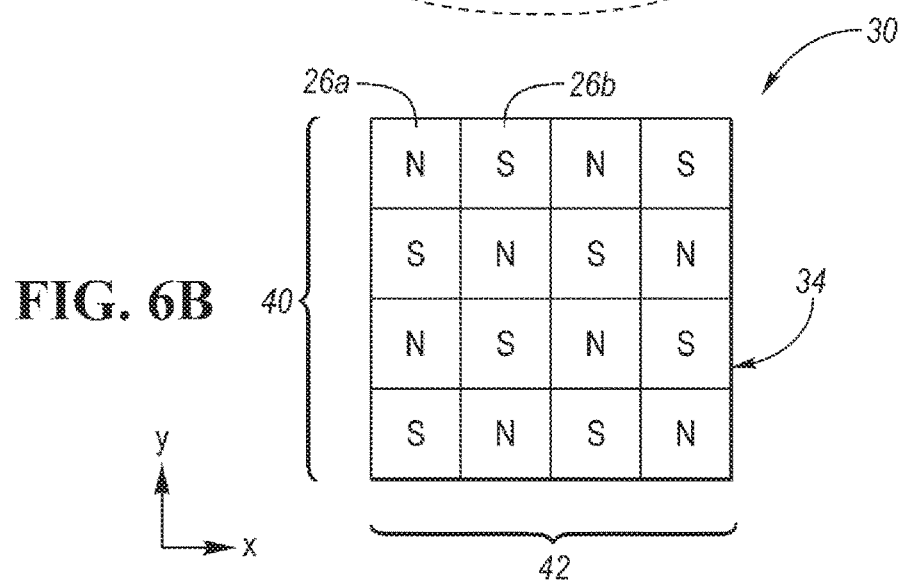
FIG. 6B illustrates a schematic diagram of an arrangement of the magnetic polarizations of the electromagnets for the electromagnet array to generate a bias magnetic field having a particular pattern required by the EMAT for the EMAT to use to transmit the shear-horizontal wave.
Figure 6C:
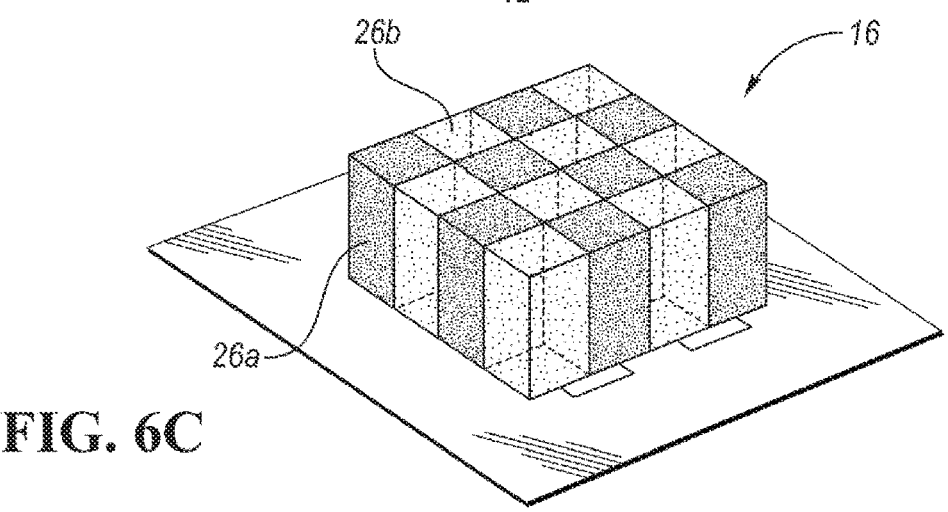
FIG. 6C illustrates an illustrative view of the magnetic polarizations of the electromagnets shown in FIG. 6B.

Referring now to FIGS. 6A, 6B, and 6C, with continual reference to FIGS. 4 and 5, the magnetic field arrangement for EMAT 16 to generate a shear-horizontal wave for transmission will be described. FIG. 6A illustrates a schematic diagram of EMAT 16 in operation to transmit a shear-horizontal wave. FIG. 6B illustrates a schematic diagram of an arrangement of the magnetic polarizations of electromagnets 17 for electromagnet array 30 to generate a bias magnetic field having a particular pattern required by EMAT 16 for the EMAT to use to transmit the shear-horizontal wave. FIG. 6C illustrates an illustrative view of the magnetic polarizations of electromagnets 17 shown in FIG. 6B.

As noted above, grid pattern 34 designates the magnetic polarizations of poles 26a and 26b of electromagnets 17 of electromagnet array 30. In this magnetic field arrangement for EMAT 16 to transmit a shear-horizontal wave, poles 26a and 26b of electromagnets have alternating magnetic polarizations (i.e., poles 26a have N magnetic polarization and poles 26b have S magnetic polarization) forming a checkerboard pattern.

Grid pattern 34 includes rows 40 and columns 42 consistent with the layout of the poles of electromagnets 17. (It is to be understood that the terminology "row" and "column" are interchangeable; that is, row(s) and column(s) may actually be column(s) and row(s), respectively.) As shown in FIG. 4, electromagnet array 30 includes a 4×2 layout of electromagnets 17 and each electromagnet has two poles 26a and 26b (i.e., 4×4 layout of electromagnet poles). Thus, in this example, grid pattern 34 includes four rows 40 and four columns 42. Each row/column pair (e.g., $(x_2, y_1)$, $(x_1, y_3)$, etc.) of grid pattern 34 defines a respective space of the grid. Poles 26a and 26b of each electromagnet 17 correspond to adjacent spaces (e.g., adjacent spaces in the same row) of grid pattern 34. The magnetic polarizations of the poles of electromagnets 17 are in the out-of-page direction.

Further, the grids of grid pattern 34 have a square footprint which approximately corresponds to the perimeter of the poles of electromagnets 17. The poles of electromagnets 17 may have square, rectangular, or circular footprints. This could mean, for instance, that the poles of some of electromagnets 17 have rectangular footprints and the poles of other ones of electromagnets 17 have square footprints.

Further, the poles of the magnetic cores of the electromagnets may be shaped to conform to a curvature of a non-planar surface or form an arc segment conforming to a curvature of a non-planar surface. As such, EMAT 16 may be shaped to conform to the curvature of an inner pipe wall or may be shaped to conform to an opposite curvature of an outer pipe wall. PCB 32 and electrical coils 36 and 38 are likewise shaped to conform to the curvature of the non-planar surface. EMAT 16 having its electromagnet array 30, PCB 32, and electrical coils 36 and 38 conformed to a curved surface provides minimal clearance between the EMAT and the curved surface and hence maximizes the strength of the electromagnetic field that interacts with the non-planar material. Ultimately, this results in the production of a stronger guided wave and higher signal-to-noise ratio.

Herein, as a convention, rows 40 of grid pattern 34 run along the x-direction and columns 42 run along the y-direction. Further, as described in greater detail herein, the y-direction is the wave propagation direction and the x-direction is the in-plane transverse direction.

In sum, electromagnet array 30 includes electromagnets 17 arranged in rows and columns with the poles of the electromagnets placed at corresponding row/column pairs. Rows of electromagnets are separated from neighboring rows of electromagnets along horizontal interfaces or boundaries. Similarly, columns of electromagnets are separated from neighboring columns of electromagnets along vertical interfaces or boundaries.

As shown in FIG. 6A, and consistent with FIG. 5, each electrical coil 36 and 38 has a pair of opposed long, straight legs 44a and 44b running in the x-direction across the entire electromagnet array 30. The placement of first and second electrical coils 36 and 38 relative to electromagnet array 17 is such that the legs of the electrical coils are positioned along a center line of a respective column of poles of the electromagnets of the electromagnet array. Put another way, each legs of each electrical coil extends across the poles located in respective columns of grid pattern 34.

As noted, in this magnetic field arrangement for EMAT 16 to transmit a shear-horizontal wave, poles 26a and 26b of electromagnets have alternating magnetic polarizations (i.e., poles 26a have N magnetic polarization and poles 26b have S magnetic polarization) forming a checkerboard pattern. With this magnetic polarization checkerboard pattern, electromagnet array 30 thereby generates the bias magnetic field having the requisite pattern enabling EMAT 16 to transmit the shear-horizontal wave. In turn, first and second electrical coils 36 and 38 are pulsed with alternating current of the same frequency, amplitude, and phase. The resultant ultrasonic wave transmitted by EMAT 16 is a shear-horizontal wave propagating in the y-direction.

Further, as indicated in FIG. 6A, the shear-horizontal wave has a wavelength which corresponds to the length in the y-direction of two rows of the poles of the electromagnets of electromagnet array 30.

Figure 7A:
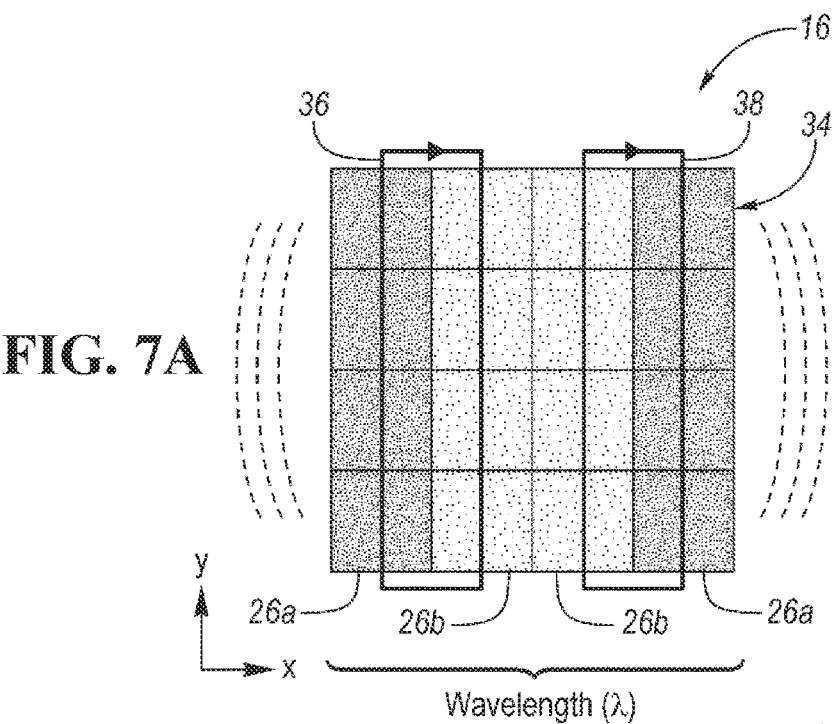
FIG. 7A illustrates a schematic diagram of the EMAT in operation to transmit a Lamb wave.
Figure 7B:
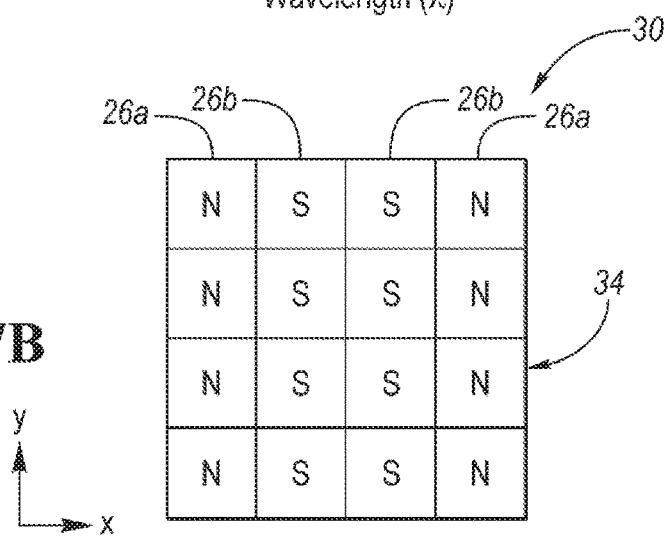
FIG. 7B illustrates a schematic diagram of another arrangement of the magnetic polarizations of the electromagnets for the electromagnet array to generate a bias magnetic field having a different pattern required by the EMAT for the EMAT to use to transmit the Lamb wave.
Figure 7C:
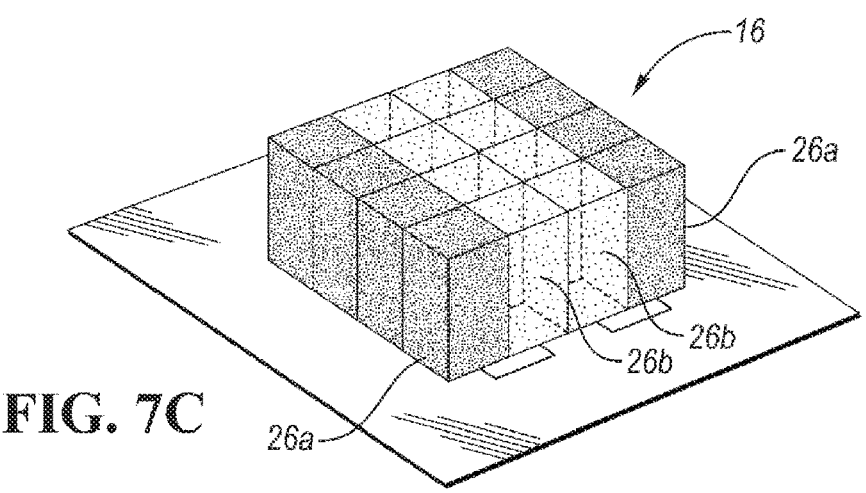
FIG. 7C illustrates an illustrative view of the magnetic polarizations of the electromagnets shown in FIG. 7B.

Referring now to FIGS. 7A, 7B, and 7C, with continual reference to FIGS. 4, 5, 6A, 6B, and 6C, the magnetic field arrangement for EMAT 16 to generate a Lamb wave for transmission will be described. FIG. 7A illustrates a schematic diagram of EMAT 16 in operation to transmit a Lamb wave. FIG. 7B illustrates a schematic diagram of the arrangement of the magnetic polarizations of electromagnets 17 for electromagnet array 30 to generate a bias magnetic field having a different pattern required by EMAT 16 for the EMAT to use to transmit the Lamb wave. FIG. 7C illustrates an illustrative view of the magnetic polarizations of electromagnets 17 shown in FIG. 7B.

In the magnetic field arrangement for EMAT 16 to transmit a Lamb wave, each column of poles have the same magnetic polarization according to a N-S-S-N pattern, as indicated in FIGS. 7A, 7B, and 7C. As such, for first and second electromagnets 17 in each row, first pole 26a of the first electromagnet has a N magnetic polarization, second pole 26b of the first electromagnet has a S magnetic polarization, first pole 26a of the second electromagnet has a S magnetic polarization, and second pole 26b of the second electromagnet has a N magnetic polarization. With this magnetic polarization pattern, electromagnet array 30 thereby generates the bias magnetic field having the requisite pattern enabling EMAT 16 to transmit the Lamb wave. In turn, first and second electrical coils 36 and 38 are pulsed with alternating current of the same frequency, amplitude, and phase. The resultant ultrasonic wave transmitted by EMAT 16 is a Lamb wave propagating in the x-direction.

Further, as indicated in FIG. 7A, the Lamb wave has a wavelength which corresponds to the width in the x-direction of the columns of the poles of the electromagnets of electromagnet array 30.

For both of the shear-horizontal wave and Lamb wave examples subject of FIGS. 6A, 6B, 6C, 7A, 7B, and 7C, as well as for other ultrasonic wave transmissions, electromagnet array 30 may have more or less electromagnets 17 and/or EMAT may have just one electrical coil or more than two electrical coils.

Referring now to FIGS. 8A, 8B, and 8C, with continual reference to FIG. 6A, schematic diagrams of EMAT 16 in operation to transmit shear-horizontal waves having different wavelengths are shown. Compared with FIG. 6A, electromagnet array 30 in FIGS. 8A, 8B, and 8C includes two additional rows of electromagnets (i.e., 6×2 array of electromagnets; or 6×4 array of electromagnet poles).

The magnetic polarization checkerboard pattern shown in FIG. 8A is the same magnetic polarization checkerboard pattern shown in FIG. 6A with the two additional rows of electromagnets. In FIG. 8B, the magnetic polarization checkerboard pattern is extended by an additional row compared with the magnetic polarization checkerboard pattern shown in FIG. 8A. In turn, the wavelength of the shear-horizontal wave transmitted by EMAT 16 according to the magnetic field arrangement of FIG. 8B is twice as large as the wavelength of the shear-horizontal wave transmitted by EMAT 16 according to the magnetic field arrangement of FIG. 8A. In FIG. 8C, the magnetic polarization checkerboard pattern is extended by an additional pair of rows compared with the magnetic polarization checkerboard pattern shown in FIG. 8B. In turn, the wavelength of the shear-horizontal wave transmitted by EMAT 16 according to the magnetic field arrangement of FIG. 8C is three times as large as the wavelength of the shear-horizontal wave transmitted by EMAT 16 according to the magnetic field arrangement of FIG. 8A.

FIGS. 9A, 9B, and 9C illustrate schematic diagrams of EMAT 16 in operation to transmit shear-bulk waves at different locations and/or with different beam widths. FIGS. 9A, 9B, and 9C depict a shear-bulk wave (single-element pulse-echo) application. In this condition, only part of electromagnet array 30 is active and only one electrical coil (e.g., only first electrical coil 36) is excited to provide a single point source. The resultant wave is a shear-bulk wave propagating in the z-direction. The combination of active electromagnets 17 and active electrical coil 36 can be used generate a wave at different locations, subject of FIGS. 9A and 9B, and generate a wave with different beam widths, subject of FIG. 9C.

The magnetic field arrangements shown in FIGS. 9A, 9B, and 9C can be modified to make a dual-element EMAT useable for thickness measurements. This is the subject of FIGS. 10A and 10B, which illustrate respective schematic diagrams of EMAT 16 in operation to transmit a shear-bulk wave and to receive any reflected-back portion of the shear-bulk wave. In this condition, one electrical coil (e.g., first electrical coil 36) is used as the ultrasonic wave generator (Tx) and the other electrical coil (e.g., second electrical coil 38) is used for the receiver (Rx). The transmission and reception wave path in the to-be-inspected part 12 is shown in FIG. 10B.

Figure 11A:
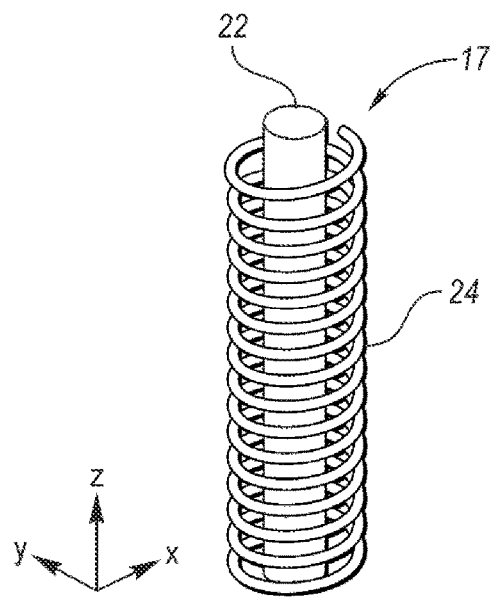
FIG. 11A illustrates a perspective view of the electromagnet, the electromagnet being a single-cylinder core electromagnet in this variation.
Figure 11B:
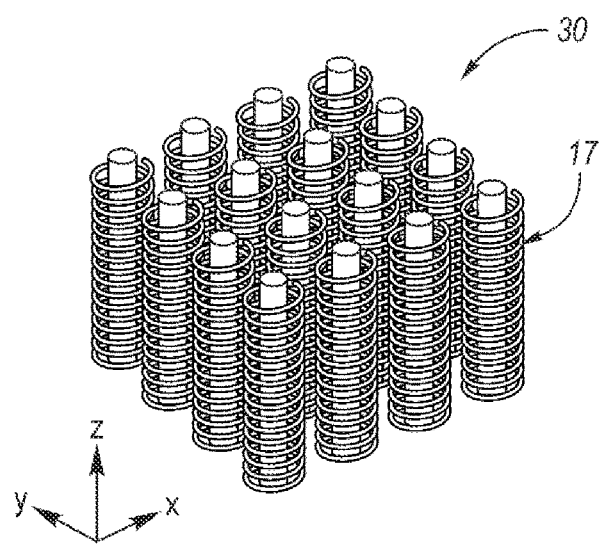
FIG. 11B illustrates a perspective view of the electromagnet array having a plurality of the single-cylinder core electromagnets.

In a variation, electromagnets 17 are single-cylinder core electromagnets. In this case, magnetic core 22 has a cylindrical shape as opposed to a U-shape. FIG. 11A illustrates a perspective view of a single-cylinder core electromagnet. FIG. 11B illustrates a perspective view of electromagnet array 30 having a plurality of single-cylinder core electromagnets 17. As shown, each electromagnet 17 includes a wound coil 24 wrapped around cylindrical-shaped magnetic core 22. Magnetic core 22 includes first and second poles at respective ends of the magnetic core. In correspondence with the cylindrical shape of magnetic core 22, the first and second poles of electromagnets 17 face in opposite directions. In this case, only one of the poles (e.g., first pole 26a) of electromagnets 17 face in the same direction toward to-be-inspected part 12.

Figure 12:
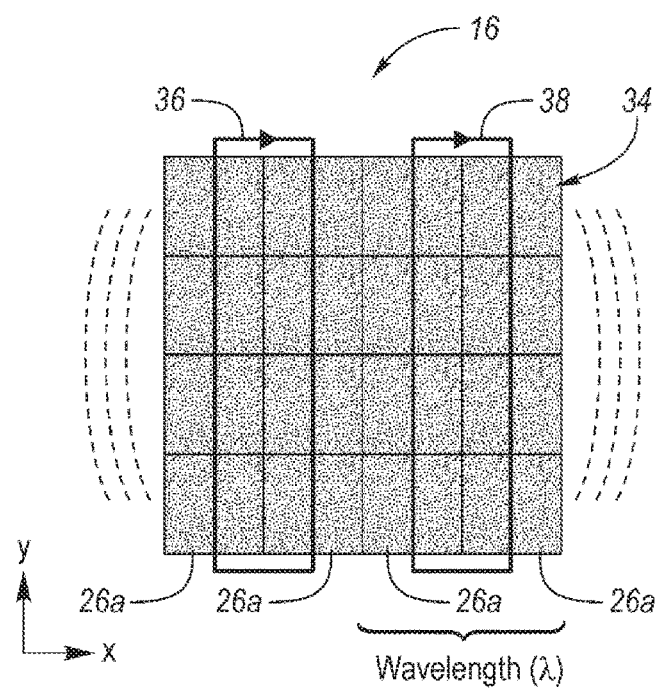
FIG. 12 illustrates a schematic diagram of the EMAT, having the electromagnet array shown in FIG. 11B, in operation to transmit a Lamb wave.

FIG. 12 illustrates a schematic diagram of EMAT 16, having electromagnet array 30 shown in FIG. 11B, in operation to transmit a Lamb wave. With the use of single-cylinder core electromagnets 17 in electromagnet array, the magnetic polarizations of first poles 26a of the electromagnets can all be the same (e.g., first poles 26a all have N magnetic polarization). As such, electromagnet array 17 has the magnetic polarization arrangement shown in FIG. 12. With this magnetic polarization arrangement, electromagnet array 30 thereby generates the bias magnetic field having the requisite pattern required by EMAT 16 for the EMAT to transmit a Lamb wave propagating in the +x and −x directions. In turn, first and second electrical coils 36 and 38 are pulsed with alternating current of the same frequency, amplitude, and phase. The resultant ultrasonic wave transmitted by EMAT 16 is a Lamb wave propagating in the +x and −x directions.

Further, as indicated in FIG. 12, the Lamb wave has a wavelength which is ½ the length of the wavelength of the Lamb wave transmitted by EMAT 16 according to the arrangement shown in FIG. 7A.

Of course, for EMATs in accordance with embodiments, the physical orientation of any of the individual electromagnets 17 in electromagnet array 30 can be rearranged for EMAT to generate different types of bias magnetic fields. One or more electromagnets 17 can be movable between first and second positions to change the physical orientation. In this regard, the EMAT assembly may further include an actuator(s) (not shown) to mechanically move electromagnets 17 between first and second positions. Similarly, the EMAT assembly may further include an actuator (not shown) to mechanically move PCB 32, and thereby first and second electrical coils 36 and 38, relative to electromagnet array 30.

Further, as an exemplary application of the physical orientation of electromagnets 17 in electromagnet array 30, electromagnet array 30 illustrated in FIG. 11B comprising single-cylinder core electromagnets 17 can produce any magnetic polarization patterns shown in FIGS. 6A, 6B, 6C, 7A, 7B, 7C, 9A, 9B, and 9C for the same ultrasonic waves to be generated.

As described, an EMAT in accordance with embodiments has an electromagnet array that is used for the EMAT to generate multiple types of ultrasonic waves. The electromagnet array provides a configurable pattern of magnetic fields for the EMAT. This allows a single EMAT to transmit different types of ultrasonic waves, including Lamb wave, shear-horizontal wave, and shear-bulk wave.

Further, EMATs in accordance with embodiments have been described herein in a transmit mode of operation. Of course, such EMATs may be used in a receive mode of operation. More descriptively, for an EMAT in accordance with embodiments, without changing the energizing pattern of electromagnet array 30 but using first and second electrical coils 36 and 38 as sensing (i.e., receiving) coils without pulsing alternating current, the EMAT functions as an ultrasonic wave receiver. As long as grid pattern 34 of the EMAT is the same for the transmitter and receiver, the transmitter and the receiver are corresponding to the same type of ultrasonic wave. This is due to the reciprocity of wave generation and reception.

As the EMAT has the ability to transmit different types of ultrasonic waves, the EMAT may be used in place of multiple EMATs each having the ability to transmit only one type of ultrasonic wave. As such, the function of multiple EMATs may be combined into just one EMAT in accordance with embodiments. This provides a reduction in size, weight, and cost. Benefits of an EMAT in accordance with embodiments may further include the ability to be used on smaller objects, an extended runtime in battery powered robotic deployment, and a lower economic threshold for potential applications.

Further, unlike a permanent magnet array, the electromagnet array of the EMAT in accordance with embodiments does not have the side effect of attraction and retention of ferromagnetic debris. Collected ferromagnetic debris can foul mechanisms and contaminate nearby electronics and the attraction and retention of ferromagnetic debris is particularly detrimental to robotic involvement. Any ferromagnetic debris collected by the electromagnet array can be released by turning off the electromagnets of the electromagnet array.

Potential users of the EMAT in accordance with embodiments include utility and gas companies with metallic containment vessels and metallic pipe distribution assets, government and commercial concerns with metallic ships and planes, and metal processing facilities.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An electro-magnetic acoustic transducer (EMAT) comprising:
   an electromagnet array having a plurality of electromagnets, each electromagnet including a magnetic core and a wound coil wrapped around the magnetic core;
   wherein the magnetic cores of the electromagnets are U-shaped magnetic cores including first and second poles facing a common plane;
   the wound coils of the electromagnets are energized in a first manner at a first time by a power supply to thereby cause the electromagnet array to generate a first bias magnetic field for the EMAT to generate a first type of ultrasonic wave; and
   the wound coils of the electromagnets are energized in a different second manner at a second time by the power supply to thereby cause the electromagnet array to generate a different second bias magnetic field for the EMAT to generate a different second type of ultrasonic wave.

2. The EMAT of claim 1 wherein:
   the wound coils of the electromagnets being energized in the first manner includes at least one of the wound coils being energized by the power supply with a positive electric current and the wound coils of the electromagnets being energized in the second manner includes the at least one of the wound coils being energized by the power supply with a negative electric current.

3. The EMAT of claim 1 wherein:
   the wound coils of the electromagnets being energized in the first manner includes (i) the wound coils of a first set of the electromagnets being energized by the power supply with a negative electric current and (ii) the wound coils of a second set of the electromagnets being energized by the power supply with a positive electric current; and
   the wound coils of the electromagnets being energized in the second manner includes (i) the wound coils of a third set of the electromagnets being energized by the power supply with a negative electric current and (ii) the wound coils of a fourth set of the electromagnets being energized by the power supply with a positive electric current.

4. The EMAT of claim 1 wherein:
   the wound coils of the electromagnets being energized in the first manner causes the poles to have a checkerboard magnetic polarization pattern for the EMAT to generate the first type of ultrasonic wave; and
   the wound coils of the electromagnets being energized in the second manner causes the poles have a non-checkerboard magnetic polarization pattern for the EMAT to generate the second type of ultrasonic wave.

5. The EMAT of claim 1 wherein:
   the electromagnet array generates in a first space a bias magnetic field having a first pattern, for the EMAT to transmit a given type of ultrasonic wave from a first location of the electromagnet array, when the wound coils of the electromagnets at the first location of the electromagnet array are energized in a given manner by the power supply and (ii) generates in a second space a bias magnetic field having a second pattern, for the EMAT to transmit the given type of ultrasonic wave from a second location of the electromagnet array, when the wound coils of the electromagnets at the second location of the electromagnet array are energized in a given manner by the power supply.

6. The EMAT of claim 1 wherein:
the electromagnet array (i) generates a bias magnetic field having a first pattern, for the EMAT to transmit a given type of ultrasonic wave having a beam width from a first location of the electromagnet array, when a given amount of the wound coils of the electromagnets at the first location of the electromagnet array are energized in a given manner by the power supply and (ii) generates a bias magnetic field having the first pattern, for the EMAT to transmit the given type of ultrasonic wave having a smaller beam width from the first location of the electromagnet array, when less than the given amount of the wound coils of the electromagnets at the first location of the electromagnet array are energized in the given manner by the power supply.

7. The EMAT of claim 1 wherein:
the electromagnet array (i) generates a bias magnetic field having a first pattern, for the EMAT to transmit a given type of ultrasonic wave with a given wavelength, when the wound coils of the electromagnets are energized a certain way by the power supply and (ii) generates a bias magnetic field having a second pattern, for the EMAT to transmit the given type of ultrasonic wave with a larger wavelength, when the would coils of the electromagnets are energized in another certain way by the power supply.

8. The EMAT of claim 1 wherein:
the magnetic cores of the electromagnets include poles having rectangular or square footprints.

9. The EMAT of claim 1 wherein:
the magnetic cores of the electromagnets include poles which either conform to a curvature of a non-planar surface or form an arc segment conforming to a curvature of a non-planar surface.

10. An electro-magnetic acoustic transducer (EMAT) comprising:
an electromagnet array having a plurality of electromagnets, each electromagnet including a magnetic core and a wound coil wrapped around the magnetic core;
an electrical coil;
wherein the electromagnets are arranged in rows;
the magnetic cores of the electromagnets include first and second poles, the first and second poles of each electromagnet are adjacently positioned in the row of the electromagnet;
the first and second poles of each electromagnet have north and south magnetic polarizations, respectively, when the wound coil of the electromagnet is energized by a power supply with an electric current of one polarity whereby the electromagnet array generates a first bias magnetic field, and the first and second poles of each electromagnet have south and north magnetic polarizations, respectively, when the wound coil of the electromagnet is energized by the power supply with an electric current of an opposite polarity whereby the electromagnet array generates a different second bias magnetic field; and
the electrical coil is placed relative to the electromagnet array such that (i) a first leg of the electrical coil extends over the rows across the first poles of the electromagnets and (ii) a second leg of the electrical coil extends over the rows across the second poles of the electromagnets.

11. The EMAT of claim 10 wherein:
the EMAT transmits a shear-horizontal wave when the electrical coil is pulsed with an alternating electrical current, the first and second poles in each odd row have north and south magnetic polarizations, respectively, and the first and second poles in each even row have south and north magnetic polarizations, respectively; and
the EMAT transmits a Lamb wave when the electrical coil is pulsed with an alternating current and the first and second poles of odd numbered electromagnets in each row have north and south magnetic polarizations, respectively, and the first and second poles of even numbered electromagnets in each row have south and north magnetic polarizations, respectively.

12. An electro-magnetic acoustic transducer (EMAT) comprising:
an electromagnet array having a plurality of electromagnets, each electromagnet including a magnetic core and a wound coil wrapped around the magnetic core;
first and second electrical coils;
wherein first and second ones of the electromagnets are arranged in rows across columns;
the magnetic cores of the electromagnets include first and second poles;
the first and second poles of the first electromagnet in each row are adjacently positioned in the row of the first electromagnet in a first one of the columns, and the first and second poles of the second electromagnet in each row are adjacently positioned in the row of the second electromagnet in a second one of the columns;
the first and second poles of each electromagnet have north and south magnetic polarizations, respectively, when the wound coil of the electromagnet is energized by a power supply with an electric current of one polarity whereby the electromagnet array generates a first bias magnetic field, and the first and second poles of each electromagnet have south and north magnetic polarizations, respectively, when the wound coil of the electromagnet is energized by the power supply with an electric current of an opposite polarity whereby the electromagnet array generates a different second bias magnetic field;
the first electrical coil is placed relative to the electromagnet array such that (i) a first leg of the first electrical coil extends over the rows across the first poles of the electromagnets in the first one of the columns and (ii) a second leg of the first electrical coil extends over the rows across the second poles of the electromagnets in the first one of the columns; and
the second electrical coil is placed relative to the electromagnet array such that (i) a first leg of the second electrical coil extends over the rows across the first poles of the electromagnets in the second one of the columns and (ii) a second leg of the second electrical coil extends over the rows across the second poles of the electromagnets in the second one of the columns.

13. The EMAT of claim 12 wherein:
the EMAT transmits a shear-horizontal wave when (i) the first and second electrical coils are pulsed with an alternating current of a same frequency, amplitude, and phase, (ii) the first and second poles of the electromagnets in each odd row have north and south magnetic polarizations, respectively, and (iii) the first and second poles of the electromagnets in each even row have south and north magnetic polarizations, respectively;

the EMAT transmits a Lamb wave when (i) the first and second electrical coils are pulsed with an alternating current of a same frequency, amplitude, and phase, (ii) the first and second poles of the electromagnets in the first one of the columns have north and south magnetic polarizations, respectively, and (iii) the first and second poles of the electromagnets in the second one of the columns have south and north magnetic polarizations, respectively; and the EMAT transmits a Lamb wave when (i) the first and second electrical coils are pulsed with an alternating current of a same frequency and amplitude but opposite phase and (ii) the first and second poles of the electromagnets in each row have north and south magnetic polarizations.

14. The EMAT of claim 12 wherein:

the first electrical coil is used for the EMAT to transmit an ultrasonic wave toward a target and the second electrical coil is used for the EMAT to receive an ultrasonic wave reflected back from the target; and the EMAT transmits a given type of ultrasonic wave toward a target and receives an ultrasonic wave of the given type reflected back from the target when the first electrical coil is pulsed with an alternating electrical current, the second electrical coil is not pulsed with any alternating electrical current, and the wound coils of the electromagnets in at least some of the rows across the first and second ones of the columns are energized in a given manner.

15. An electro-magnetic acoustic transducer (EMAT) comprising:

an electromagnet array having a plurality of electromagnets, each electromagnet including a magnetic core and a wound coil wrapped around the magnetic core;

an electrical coil having first and second coil segments;

wherein first and second ones of the electromagnets are arranged in rows across columns;

the magnetic cores of the electromagnets include first and second poles;

the first and second poles of the first electromagnet in each row are adjacently positioned in the row of the first electromagnet in a first one of the columns, and the first and second poles of the second electromagnet in each row are adjacently positioned in the row of the second electromagnet in a second one of the columns;

the first and second poles of each electromagnet have north and south magnetic polarizations, respectively, when the wound coil of the electromagnet is energized by a power supply with an electric current of one polarity whereby the electromagnet array generates a first bias magnetic field, and the first and second poles of each electromagnet have south and north magnetic polarizations, respectively, when the wound coil of the electromagnet is energized by the power supply with an electric current of an opposite polarity whereby the electromagnet array generates a different second bias magnetic field; and the first coil is placed relative to the electromagnet array such that (i) a first leg of the first coil segment extends over the rows across the first poles of the electromagnets in the first one of the columns, (ii) a second leg of the first coil segment extends over the rows across the second poles of the electromagnets in the first one of the columns, (iii) a first leg of the second coil segment extends over the rows across the first poles of the electromagnets in the second one of the columns, and (iv) a second leg of the second coil segment extends over the rows across the second poles of the electromagnets in the second one of the columns.

16. The EMAT of claim 15 wherein:

the EMAT transmits a shear-horizontal wave when (i) the electrical coil is pulsed with an alternating current, (ii) the first and second poles of the electromagnets in each odd row have north and south magnetic polarizations, respectively, and (iii) the first and second poles of the electromagnets in each even row have south and north magnetic polarizations, respectively; and the EMAT transmits a Lamb wave when (i) the electrical coil is pulsed with an alternating current, (ii) the first and second poles of the electromagnets in the first one of the columns have north and south magnetic polarizations, respectively, and (iii) the first and second poles of the electromagnets in the second one of the columns have south and north magnetic polarizations, respectively.

17. An electro-magnetic acoustic transducer (EMAT) comprising:

an electromagnet array having a plurality of electromagnets, each electromagnet including a magnetic core and a wound coil wrapped around the magnetic core;

first and second electrical coils;

wherein first and second ones of the electromagnets are arranged in rows across columns;

the magnetic cores of the electromagnets include first and second poles;

the first and second poles of the first electromagnet in each row are adjacently positioned in the row of the first electromagnet in a first one of the columns, and the first and second poles of the second electromagnet in each row are adjacently positioned in the row of the second electromagnet in a second one of the columns;

the first electrical coil is placed relative to the electromagnet array such that (i) a first leg of the first electrical coil extends over the rows across the first poles of the electromagnets in the first one of the columns and (ii) a second leg of the first electrical coil extends over the rows across the second poles of the electromagnets in the first one of the columns;

the second electrical coil is placed relative to the electromagnet array such that (i) a first leg of the second electrical coil extends over the rows across the first poles of the electromagnets in the second one of the columns and (ii) a second leg of the second electrical coil extends over the rows across the second poles of the electromagnets in the second one of the columns;

while the second electrical coil is not pulsed with an alternating current, the electromagnets in the first one of the columns generate a bias magnetic field for the EMAT to transmit a given type of ultrasonic wave from a first location of the electromagnet array when the first electrical coil is pulsed with an alternating current and the electromagnets in the first one of the columns are energized by a power supply; and while the first electrical coil is not pulsed with an alternating current, the electromagnets in the second one of the columns generate a bias magnetic field for the EMAT to receive a given type of ultrasonic wave from a second location of the electromagnet array when the second electrical coil is pulsed with an alternating current and the electromagnets in the second one of the columns are energized by the power supply.

\* \* \* \* \*